(12) United States Patent
Hibi et al.

(10) Patent No.: US 9,027,912 B2
(45) Date of Patent: May 12, 2015

(54) VIBRATION DAMPING DEVICE

(71) Applicants: Tokai Rubber Industries, Ltd., Komaki-shi, Aichi (JP); Toyota Jidosha Kabushiki Kaisha, Toyota-shi, Aichi (JP)

(72) Inventors: Satoru Hibi, Ichinomiya (JP); Akio Saiki, Komaki (JP); Takayoshi Yasuda, Kitanagoya (JP); Masahiro Ohnishi, Ichinomiya (JP); Kentaro Mori, Nagoya (JP); Nobuya Yoshida, Toyota (JP); Hiroshi Miya, Nagakute (JP)

(73) Assignees: Tokai Rubber Industries, Ltd., Komaki-shi (JP); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 14/252,262

(22) Filed: Apr. 14, 2014

(65) Prior Publication Data
US 2014/0367546 A1   Dec. 18, 2014

(30) Foreign Application Priority Data
Jun. 17, 2013  (JP) ................................. 2013-126276

(51) Int. Cl.
| F16F 1/387 | (2006.01) |
| F16F 1/42 | (2006.01) |
| F16F 15/08 | (2006.01) |
| F16F 1/38 | (2006.01) |

(52) U.S. Cl.
CPC .............. *F16F 15/08* (2013.01); *F16F 1/3835* (2013.01); *F16F 1/3828* (2013.01); *F16F 1/3873* (2013.01); *F16F 1/3807* (2013.01)

(58) Field of Classification Search
CPC ... F16F 15/08; F16F 2236/123; B60K 5/1208
USPC .......... 248/635; 267/140.11, 140.12, 140.13, 267/140.2, 141, 141.2, 141.3, 141.7
See application file for complete search history.

(56) References Cited

U.S. PATENT DOCUMENTS

| 2,147,660 A | * | 2/1939 | Loewus ........................ 248/613 |
| 2,160,297 A | * | 5/1939 | Thompson .................... 248/635 |
| 4,316,643 A | * | 2/1982 | Burk et al. .................... 384/125 |
| 4,809,960 A | * | 3/1989 | Kakimoto et al. ............. 267/141 |
| 4,913,411 A | * | 4/1990 | Collins et al. ............. 267/141.5 |

(Continued)

FOREIGN PATENT DOCUMENTS

| EP | 0 514 329 B1 | 9/1995 |
| JP | A-11-063058 | 3/1999 |

(Continued)

*Primary Examiner* — Michael Safavi
(74) *Attorney, Agent, or Firm* — Oliff PLC (57) ABSTRACT

A vibration damping device including: an inner shaft member; a main rubber elastic body fixed to an outer circumference surface of the inner shaft member; and an outer bracket attached to an outer circumference surface of the main rubber elastic body. At least one locking projection formed to an inner circumference surface on a bracket main unit provided to the outer bracket is inserted and locked in a circumference direction in at least one locking groove formed on the outer circumference surface of the main rubber elastic body. The main rubber elastic body is held between axially opposed surfaces of an abutting protruding part formed on one axial end of the bracket main unit and a retaining protruding part formed on a press fit metal fitting press fit and fixed to another axial end of the bracket main unit.

8 Claims, 8 Drawing Sheets

(56) References Cited

U.S. PATENT DOCUMENTS

| | | | |
|---|---|---|---|
| 5,139,244 A * | 8/1992 | Chakko | 267/293 |
| 5,152,510 A * | 10/1992 | Komabashiri | 267/141.2 |
| 5,158,269 A * | 10/1992 | Hein et al. | 267/220 |
| 5,303,896 A * | 4/1994 | Sterka | 248/557 |
| 5,435,516 A * | 7/1995 | Ogasawara et al. | 248/635 |
| 5,511,997 A * | 4/1996 | Yoshida | 440/52 |
| 5,580,028 A * | 12/1996 | Tomczak et al. | 248/634 |
| 5,718,407 A * | 2/1998 | Lee | 248/634 |
| 5,743,509 A * | 4/1998 | Kanda et al. | 248/635 |
| 5,746,411 A * | 5/1998 | Bruas et al. | 248/635 |
| 5,865,429 A * | 2/1999 | Gautheron | 267/141.7 |
| 5,884,892 A * | 3/1999 | Gassen et al. | 248/635 |
| 5,906,360 A * | 5/1999 | Kanda | 267/140.12 |
| 6,029,942 A * | 2/2000 | Daddis et al. | 248/635 |
| 6,416,030 B1 * | 7/2002 | Bergdahl et al. | 248/635 |
| 6,588,820 B2 * | 7/2003 | Rice | 296/35.1 |
| 6,666,437 B2 * | 12/2003 | Larmande et al. | 267/141.2 |
| 6,729,611 B2 * | 5/2004 | Deschaume et al. | 267/140.12 |
| 6,733,039 B2 * | 5/2004 | Honda et al. | 280/780 |
| 7,261,365 B2 * | 8/2007 | Dickson et al. | 296/190.07 |
| 7,510,163 B2 * | 3/2009 | Schlitzkus et al. | 248/635 |
| 7,722,018 B2 * | 5/2010 | Meyerboeck et al. | 267/293 |
| 8,226,066 B2 * | 7/2012 | Kubat et al. | 248/634 |
| 2006/0261531 A1 * | 11/2006 | Kim | 267/140.12 |
| 2006/0279029 A1 * | 12/2006 | Souyri | 267/140.12 |
| 2007/0296128 A1 * | 12/2007 | Asano et al. | 267/140.12 |

FOREIGN PATENT DOCUMENTS

| | | |
|---|---|---|
| JP | A-11-257397 | 9/1999 |
| JP | B-3490113 | 1/2004 |
| JP | B-3693834 | 9/2005 |
| JP | A-2009-293766 | 12/2009 |

* cited by examiner

VIBRATION DAMPING DEVICE

INCORPORATED BY REFERENCE

The disclosure of Japanese Patent Application No. 2013-126276 filed on Jun. 17, 2013 including the specification, drawings and abstract is incorporated herein by reference in its entirety.

BACKGROUND OF THE INVENTION

1. Field of the Invention

The present invention relates to a vibration damping device used for example as an automobile engine mount, a suspension member mount or the like.

2. Description of the Related Art

From the past, vibration damping devices have been known as one type of vibration damping connecting body or vibration damping support body that is interposed between members constituting a vibration transmission system and does vibration damping connection of these members to each other. As a vibration damping device, for example, as shown in Japanese Unexamined Patent Publication No. JP-A-11-257397, used is a constitution with which the vibration damping device main unit for which a main rubber elastic body is fixed to the outer circumference surface of an inner shaft member is fit into a tube part of an outer bracket, and the tube part is fitted to the outer circumference surface of the main rubber elastic body non-adhesively.

Meanwhile, when the tube part is fitted non-adhesively to the outer circumference surface of the main rubber elastic body, it is necessary to restrict the relative displacement volume of the main rubber elastic body and the tube part. In particular, with the axial direction which is the fitting in direction of the main rubber elastic body, it is necessary to restrict the relative displacement volume of the vibration damping device main unit and the tube part so as to prevent falling out of the vibration damping device main unit from the tube part.

In light of that, the proposal with JP-A-11-257397 is that an overhang part is formed projecting further outward in the axial direction from both axial ends of the tube part. Then, after the tube part is attached to the outer circumference surface of the main rubber elastic body, the overhang part is bent to the inner circumference side of the tube part, and falling out of the main rubber elastic body is prevented by the abutment of the overhang part and the axial end surface of the main rubber elastic body.

However, with the vibration damping device equipped with this kind of retaining structure noted in JP-A-11-257397, after the main rubber elastic body is housed in the outer bracket tube part, it is necessary to provide an overhang part using press processing, welding or the like on the axial end part of the tube part, and there was the risk that the outer bracket structure would become complex, and that this would require time and labor for manufacturing. Also, when forming the tube part by bending a plate member equipped with the overhang part, if the plate member is too thin, there is the risk that the tube part rigidity will be insufficient, while on the other hand, if the plate member is too thick, there is the risk that it will be difficult to do the bending process of the overhang part. Furthermore, since it is necessary to bend the overhang part in a state with the main rubber elastic body housed in the tube part, the rigidity is reduced by partially forming the overhang part on the circumference or the like so that the bending process is easy, but with this kind of structure, there were also cases when depending on the size of the input load, the shape of the main rubber elastic body or the like, it was difficult to have sufficient load bearing to prevent falling out of the main rubber elastic body in the axial direction.

Japanese Unexamined Patent Publication No. JP-A-2009-293766 indicates a structure in which a protruding part projecting to the inner circumference side at the axial center of the outer bracket tube part is formed, and also, a concave groove open to the outer circumference surface of the axial center of the main rubber elastic body and extending in the circumference direction is formed. By doing insertion locking of the protruding part in the concave groove, the main rubber elastic body is prevented from falling out of the outer bracket. However, this kind of structure shown in JP-A-2009-293766 can be used as long as it is a main rubber elastic body having a leg part for which the shape does not greatly affect the vibration damping characteristics, but for example when a concave groove of a size for which sufficient retaining action can be obtained is formed on the main rubber elastic body such as that noted in JP-A-11-257397, there was the problem of an adverse effect on the vibration damping characteristics and durability due to the decrease in rubber volume. Meanwhile, when the concave groove is made smaller to suppress the effect on vibration damping characteristics and durability, the retaining action in the axial direction is insufficient, and there was the risk that the main rubber elastic body could fall out from the outer bracket during input of a large load.

SUMMARY OF THE INVENTION

It is therefore one object of the present invention to provide a vibration damping device of a novel structure that can effectively prevent falling out of the main rubber elastic body from the outer bracket while realizing the target vibration damping characteristics and durability.

The above and/or optional objects of this invention may be attained according to at least one of the following modes of the invention. The following modes and/or elements employed in each mode of the invention may be adopted at any possible optional combinations.

A first mode of the invention provides a vibration damping device comprising: an inner shaft member; a main rubber elastic body fixed to an outer circumference surface of the inner shaft member; an outer bracket attached to an outer circumference surface of the main rubber elastic body; and at least one locking groove formed extending in an axial direction on the outer circumference surface of the main rubber elastic body, wherein the outer bracket is equipped with a die formed tube shaped bracket main unit, and the bracket main unit has at least one locking projection formed extending in the axial direction projecting to an inner circumference surface on the bracket main unit, the locking projection of the bracket main unit is inserted and locked in a circumference direction in the locking groove of the main rubber elastic body with the bracket main unit being fitted externally onto the outer circumference surface of the main rubber elastic body, an abutting protruding part projecting to an inner circumference side is formed on one axial end of the bracket main unit, and the abutting protruding part overlaps in the axial direction on an outer circumference end part of the main rubber elastic body, a ring shaped press fit metal fitting is press fit and fixed to another axial end of the bracket main unit, the inner circumference surface of the bracket main unit and an inner circumference surface of the press fit metal fitting cooperate and are attached to the outer circumference surface of the main rubber elastic body, a retaining protruding part projecting to an inner circumference side of the press fit metal fitting overlaps in the axial direction on the outer circumference end part of the main rubber elastic body, and the main rubber elastic body is held between axially opposed surfaces of the abutting protruding part and the retaining protruding part.

With the vibration damping device of this kind of structure according to the first mode, in a state with the main rubber elastic body attached to the outer bracket, the locking projection of the bracket main unit is inserted in and locked with the locking groove of the main rubber elastic body in the circumference direction. As a result, the main rubber elastic body and the outer bracket are aligned with each other in the circumference direction. This arrangement makes it possible to obtain the required spring characteristics separately for each axis-perpendicular direction, and to effectively exhibit the target vibration damping performance.

Also, the outer circumference end part of the main rubber elastic body is held between axially opposed surfaces of the abutting protruding part of the bracket main unit and the retaining protruding part of the press fit metal fitting. As a result, the main rubber elastic body and the outer bracket are also aligned with each other in the axial direction, and falling out of the main rubber elastic body from the outer bracket is prevented.

This kind of retaining of the main rubber elastic body in the outer bracket is realized simply by the press fit metal fitting being press fit and fixed to the bracket main unit in a state with the main rubber elastic body inserted in the bracket main unit. In fact, the bracket main unit and the press fit metal fittings are separate units, and it is possible to obtain a high rigidity bracket main unit using die forming. By forming the retaining protruding part in advance on the press fit metal fitting before attaching to the bracket main unit, it is possible to use the press fit metal fitting having sufficient deformation rigidity without considering post-attachment bending processing properties and the like.

Furthermore, the inner circumference surface of the bracket main unit and the inner circumference surface of the press fit metal fitting cooperate and are attached to the outer circumference surface of the main rubber elastic body. This makes it possible to strongly attach the outer bracket to the outer circumference surface of the main rubber elastic body while ensuring sufficient press fit margin of the press fit metal fitting in relation to the bracket main unit.

The second mode of the present invention provides the vibration damping device of the first mode, wherein with the locking projection of the bracket main unit being fit into the locking groove of the main rubber elastic body and being pushed against the locking groove in the circumference direction, the outer circumference end part of the main rubber elastic body is pre-compressed in the circumference direction.

With the second mode, since the outer circumference end part of the main rubber elastic body is pre-compressed in the circumference direction by attachment to the bracket main unit, the spring characteristics of the main rubber elastic body can be adjusted easily. In particular, while the outer circumference end part of the main rubber elastic body is pre-compressed, there is substantially no effect on the spring by the pre-compression on the inner circumference part of the main rubber elastic body. Thus, for example it is possible to set the spring in the axis-perpendicular direction to be hard while setting the spring for torsion input to the circumference direction to be soft.

The third mode of the present invention provides the vibration damping device according to the first or second mode, wherein with the outer circumference surface of a part away from the locking groove of the main rubber elastic body being pressed against the inner circumference surfaces of the bracket main unit and the press fit metal fitting, the main rubber elastic body is pre-compressed in an axis-perpendicular direction.

With the third mode, the main rubber elastic body is pre-compressed in the axis-perpendicular direction by being attached to the bracket main unit. Thus, the spring characteristics of the main rubber elastic body are adjusted easily. In particular, the change in the spring due to the pre-compression is applied to roughly the entirety of the main rubber elastic body. This makes it possible to easily adjust the spring constant of the overall main rubber elastic body, and it is possible to set a hard spring in a plurality of different directions.

The fourth mode of the present invention provides the vibration damping device according to any one of the first through third modes, wherein with the outer circumference end part of the main rubber elastic body being grasped between axially opposed surfaces of the abutting protruding part and the retaining protruding part, the outer circumference end part of the main rubber elastic body is pre-compressed in the axial direction.

With the fourth mode, since the main rubber elastic body is pre-compressed in the axial direction by attachment to the outer bracket, the spring characteristics of the main rubber elastic body are adjusted easily. Also, while the outer circumference end part of the main rubber elastic body is pre-compressed, there is substantially no effect on the spring by the pre-compression in the inner circumference part of the main rubber elastic body. Thus, the same as with the second mode, it is possible to adjust the spring according to the required characteristics that differ for each input direction and the like.

The fifth mode of the present invention provides the vibration damping device according to any one of the first through fourth modes, wherein a projecting tip surface of the locking projection is arranged separated from and facing opposite a bottom surface of the locking groove.

With the fifth mode, by a space being formed between the bottom surface of the locking groove and the projecting tip surface of the locking projection, swelling deformation in the space interior is allowed for the main rubber elastic body during elastic deformation caused by vibration input. Therefore, it is possible to prevent the spring constant of the main rubber elastic body from becoming markedly higher during elastic deformation, and possible to set a suitable spring constant.

In fact, when the main rubber elastic body is fitted to the outer bracket in an elastically deformed state, elastic deformation is allowed in the space between the locking groove and the locking projection during mounting of the main rubber elastic body to the outer bracket. Thus, the work of attaching the main rubber elastic body and the outer bracket is easy.

The sixth mode of the present invention provides the vibration damping device according to any one of the first through fifth modes, wherein the at least one locking groove comprises a plurality of locking grooves which are formed on an circumference of the main rubber elastic body, while the at least one locking projection comprises a plurality of locking projections which are formed at positions corresponding to each locking groove on the bracket main unit, and the locking projections are respectively inserted in the plurality of locking grooves to be locked in the circumference direction.

With the sixth mode of the present invention, by the locking groove and the locking projection being locked in the circumference direction at a plurality of locations on the circumference, the relative rotation of the main rubber elastic body in relation to the outer bracket is more effectively restricted. As a result, the spring characteristics set for the respective axis-perpendicular directions of the main rubber elastic body are separately exhibited in the appropriate direction, and it is possible to effectively obtain the target vibration damping performance.

The seventh mode of the present invention provides the vibration damping device according to the sixth mode, wherein the main rubber elastic body is equipped with a pair of first rubber arms sandwiching the inner shaft member and projecting to both sides, while a pair of second rubber arms sandwiching the inner shaft member in a direction orthogonal to the pair of first rubber arms and projecting to both sides, and the locking grooves are respectively formed between the first rubber arms and the second rubber arms in the circumference direction.

With the seventh mode, by suitably setting the shape and dimensions and the like for each of the first rubber arms and the second rubber arms, the spring characteristics in the two axis-perpendicular directions that are mutually orthogonal can be respectively adjusted with high precision roughly independently, and it is possible to effectively obtain the target vibration damping performance.

The eighth mode of the present invention provides the vibration damping device according to any one of the first through seventh modes, wherein the retaining protruding part of the press fit metal fitting is continuously formed along an entire circumference.

With the eighth mode, since the abutting surface of the main rubber elastic body and the retaining protruding part is ensured along a broad range on the circumference, falling out of the main rubber elastic body in the axial direction in relation to the outer bracket is more effectively prevented. In fact, by ensuring a large abutting surface area of the main rubber elastic body and the retaining protruding part during load input in the axial direction, stress during abutting is more greatly dispersed, and the durability of the main rubber elastic body is increased.

With the present invention, the outer bracket attached to the outer circumference surface of the main rubber elastic body is constituted to have the press fit metal fitting be press fit and fixed to the bracket main unit, and since the outer circumference end part of the main rubber elastic body is held between the abutting protruding part of the bracket main unit and the retaining protruding part of the press fit metal fitting in the axial direction, falling out of the main rubber elastic body from the outer bracket is effectively prevented. Furthermore, by the locking projection of the bracket main unit being inserted in the locking groove of the main rubber elastic body and locked in the circumference direction, relative rotation of the main rubber elastic body in relation to the outer bracket in the circumference direction is prevented, and it is possible to effectively obtain the vibration damping characteristics of each axis-perpendicular direction separately.

In fact, since the press fit metal fitting is a separate unit in relation to the bracket main unit, it is possible to set the die formed bracket main unit to a sufficient strength, and also to make it possible to form the retaining protruding part in advance on the press fit metal fitting single unit before press fitting to the bracket main unit, so it is possible to set the strength of the press fit metal fitting to also be sufficiently high.

Furthermore, the inner circumference surface of the bracket main unit and the inner circumference surface of the press fit metal fitting cooperate to be attached to the outer circumference surface of the main rubber elastic body. Therefore, it is possible to ensure sufficient attachment surface area of the outer bracket to the outer circumference surface of the main rubber elastic body while strongly fixing the press fit metal fitting to the bracket main unit by ensuring a large press fit margin.

BRIEF DESCRIPTION OF THE DRAWINGS

The foregoing and/or other objects, features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Following, we will describe embodiments of the present invention while referring to the drawings.

Figure 1:
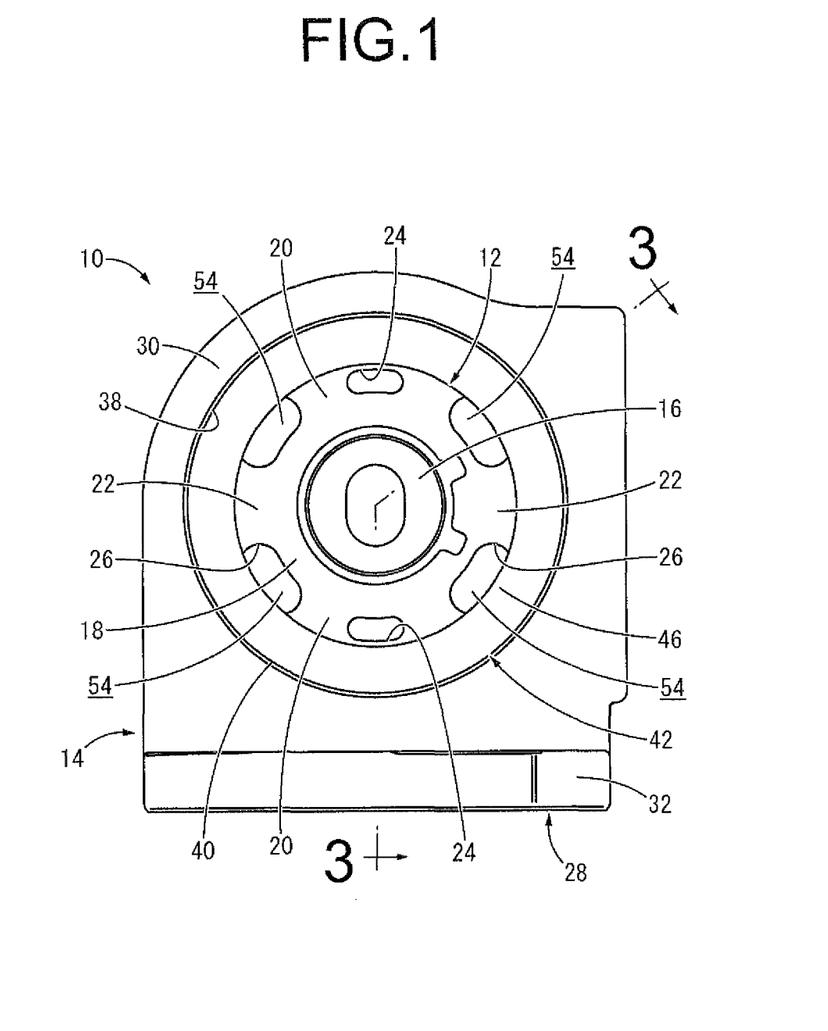
FIG. 1 is a front view showing a vibration damping device in the form of an engine mount as an embodiment of the present invention.
Figure 2:
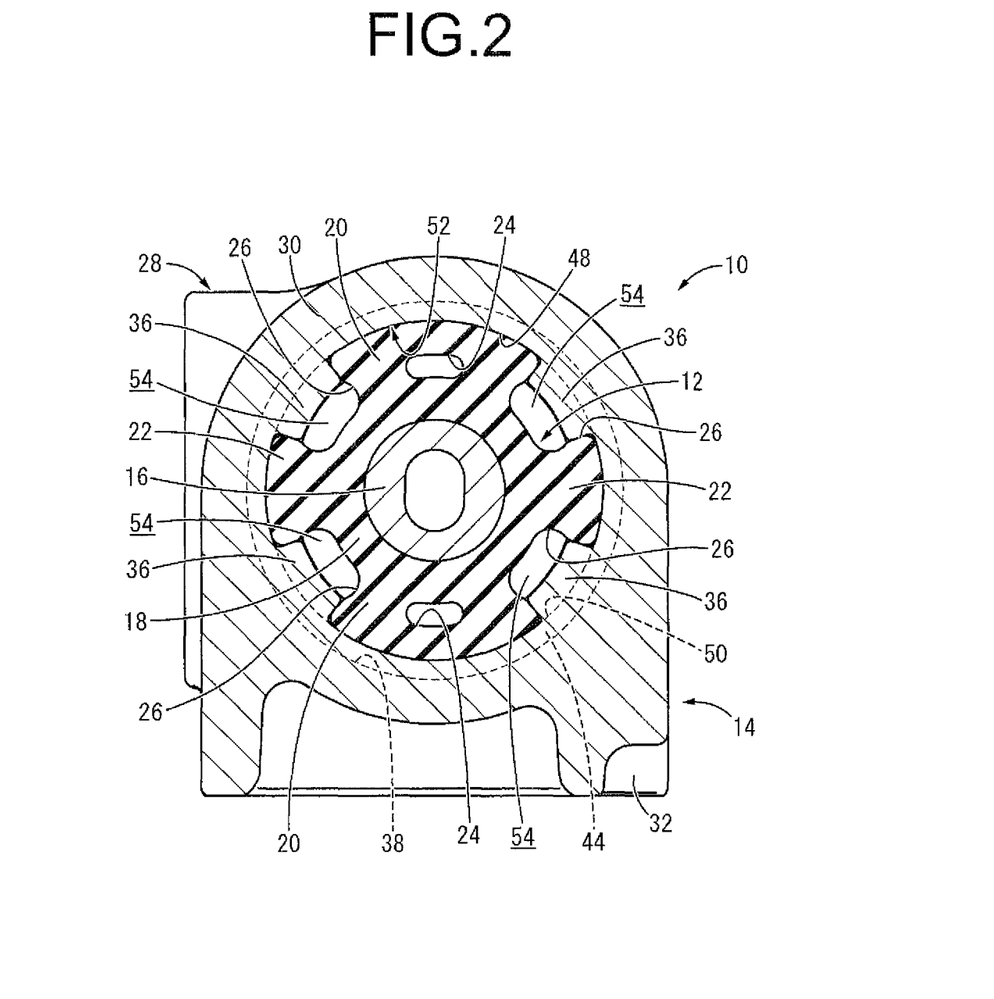
FIG. 2 is a vertical cross sectional view of the engine mount shown in FIG. 1, which correlates to cross section taken along line 2-2 of FIG. 3.
Figure 3:
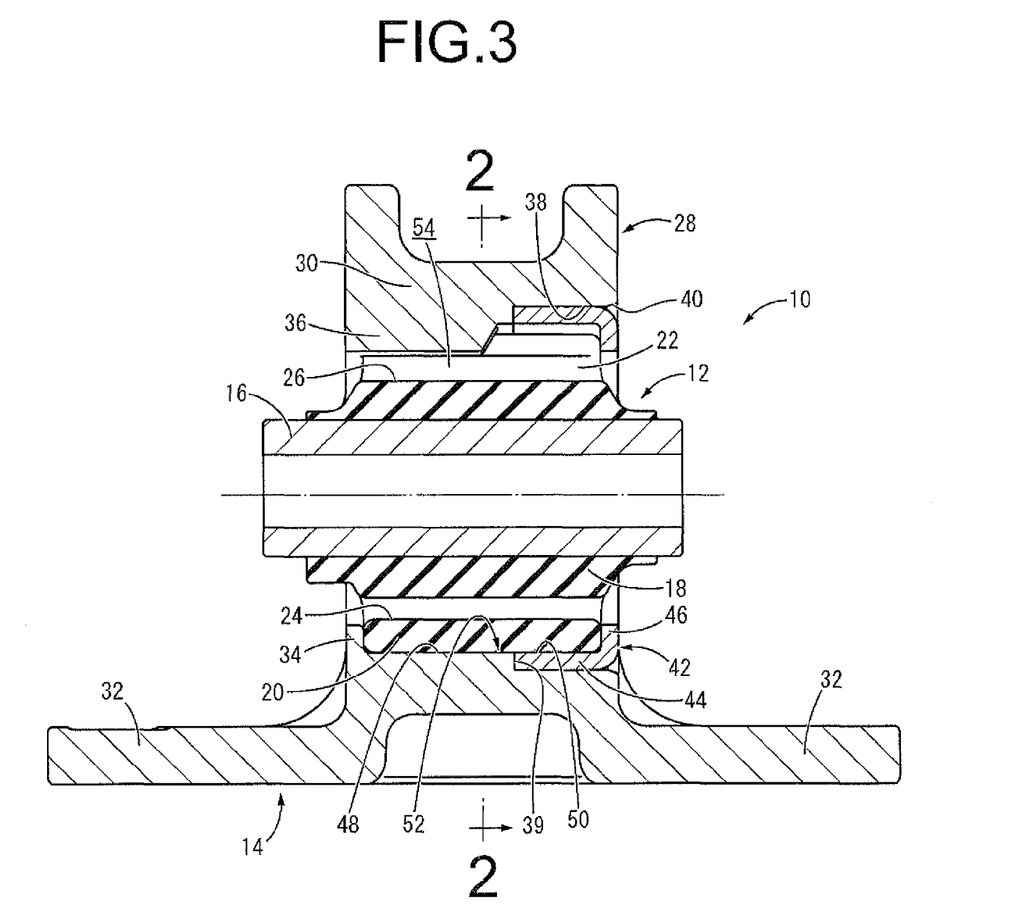
FIG. 3 is a cross sectional view taken along line 3-3 of FIG. 1.

FIG. 1 through FIG. 3 show an engine mount 10 of an automobile as an embodiment of the vibration damping device according to the present invention. The engine mount 10 is equipped with a vibration damping device main unit 12 and an outer bracket 14. In the descriptions hereafter, as a general rule, the vertical direction means the vertical direction in FIG. 1 which is the vertical direction with the engine mount 10 mounted in the vehicle, the left-right direction means the left-right direction in FIG. 1, and the front-rear direction means the direction orthogonal to the paper surface in FIG. 1 which is the axial direction of the engine mount 10.

Figure 4:
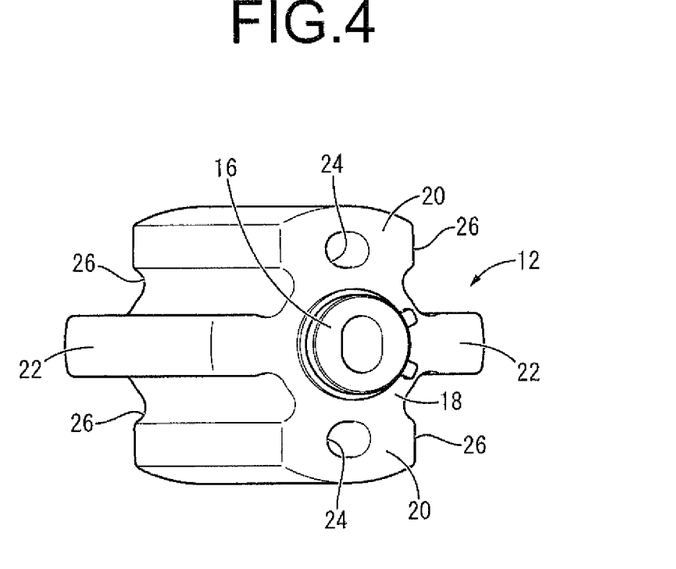
FIG. 4 is a perspective view of a vibration damping device main unit constituting the engine mount shown in FIG. 1.
Figure 5:
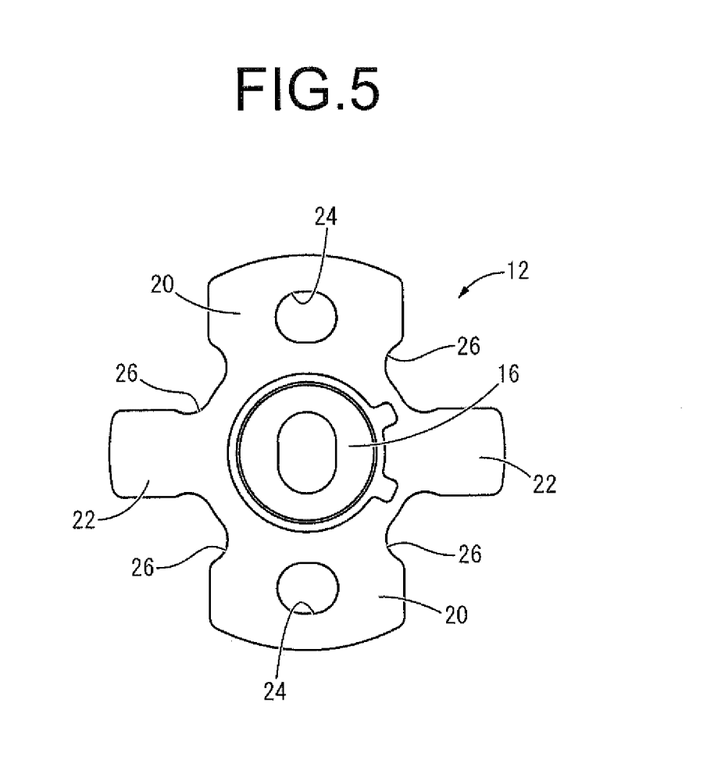
FIG. 5 is a front view of the vibration damping device main unit shown in FIG. 4.

In more detail, as shown in FIG. 4 and FIG. 5, the vibration damping device main unit 12 has a structure with which a main rubber elastic body 18 is bonded by vulcanization to the outer circumference surface of an inner shaft member 16. The inner shaft member 16 is a high rigidity member formed using a metal such as iron, an aluminum alloy or the like, or a fiber-reinforced synthetic resin or the like. Besides, as shown in FIG. 2 and FIG. 3, the inner shaft member 16 is a small diameter tube extending in a straight line, whose outer circumference surface is a cylindrical surface, and whose center hole piercing through the axial direction has a roughly oblong shaped cross section.

The main rubber elastic body 18 is integrally equipped with a pair of first rubber arms 20, 20 projecting to both the up and down sides from the inner shaft member 16, and a pair of second rubber arms 22, 22 projecting to both the left and right sides from the inner shaft member 16, and exhibits roughly a cross shape in the axial direction view (see FIG. 5).

The first rubber arms 20 have a circumference direction width dimension that is larger than the outer diameter dimension of the inner shaft member 16. A through hole 24 is formed by piercing to pierce the first rubber arm 20 through the axial direction in the roughly oblong cross section on the roughly center part of the circumference direction, and the spring constant is adjusted. Furthermore, the first rubber arms 20 have both sides of the circumference direction of the base end part carved out, and the base end part has a narrower width than the tip part.

The second rubber arms 22 project in the direction roughly orthogonal to the projecting direction of the first rubber arms 20, 20, and have a circumference direction width dimension smaller than that of the first rubber arms 20, and with this embodiment, are formed with a circumference width dimension even smaller than the outer diameter dimension of the inner shaft member 16. Furthermore, the second rubber arms 22 have both sides of the circumference direction of the base end part carved out, and the base end part has a narrower width than the tip part.

Furthermore, locking grooves 26 are respectively formed between the first rubber arms 20 and the second rubber anus 22 in the circumference direction. The locking grooves 26 are concave grooves extending along the entire length in the axial direction of the main rubber elastic body 18, and open at the outer circumference surface of the main rubber elastic body 18, and two axial end parts are open to the respective axial end surfaces of the main rubber elastic body 18. Furthermore, with this embodiment, the locking grooves 26 gradually expand in the circumference direction toward the outer circumference side, and by the base end part of the first rubber arms 20 and the second rubber arms 22 having a narrow width, the locking grooves 26 have a broader width near the base part. The locking grooves 26 are formed at a depth that does not reach the inner shaft member 16, and the wall surface of the locking grooves 26 is constituted by the main rubber elastic body 18 along its entirety. On the main rubber elastic body 18, four locking grooves 26, 26, 26, 26 are formed on the circumference, and the pair of first rubber arms 20, 20 and the pair of second rubber arms 22, 22 are formed sandwiching those four locking grooves 26, 26, 26, 26.

Figure 6:
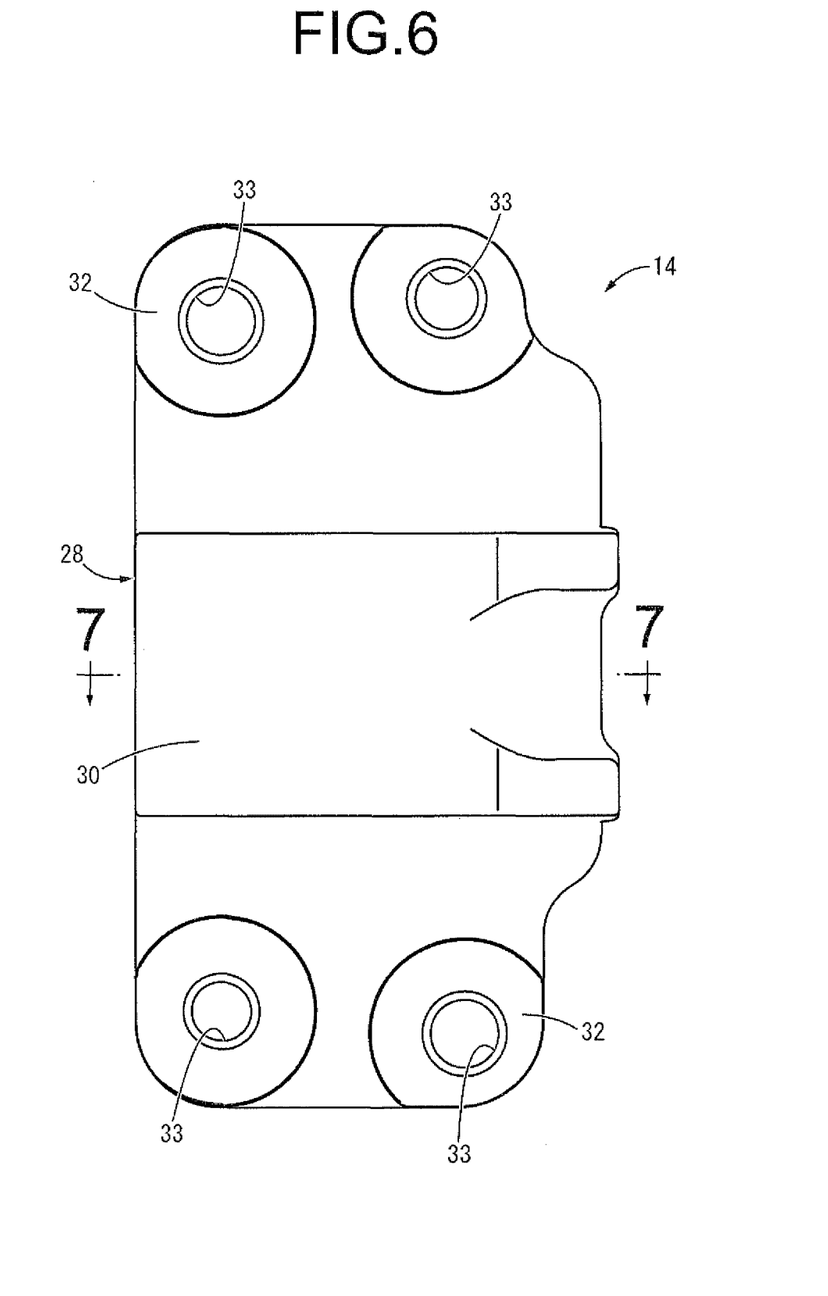
FIG. 6 is a plan view of an outer bracket constituting the engine mount shown in FIG. 1.
Figure 7:
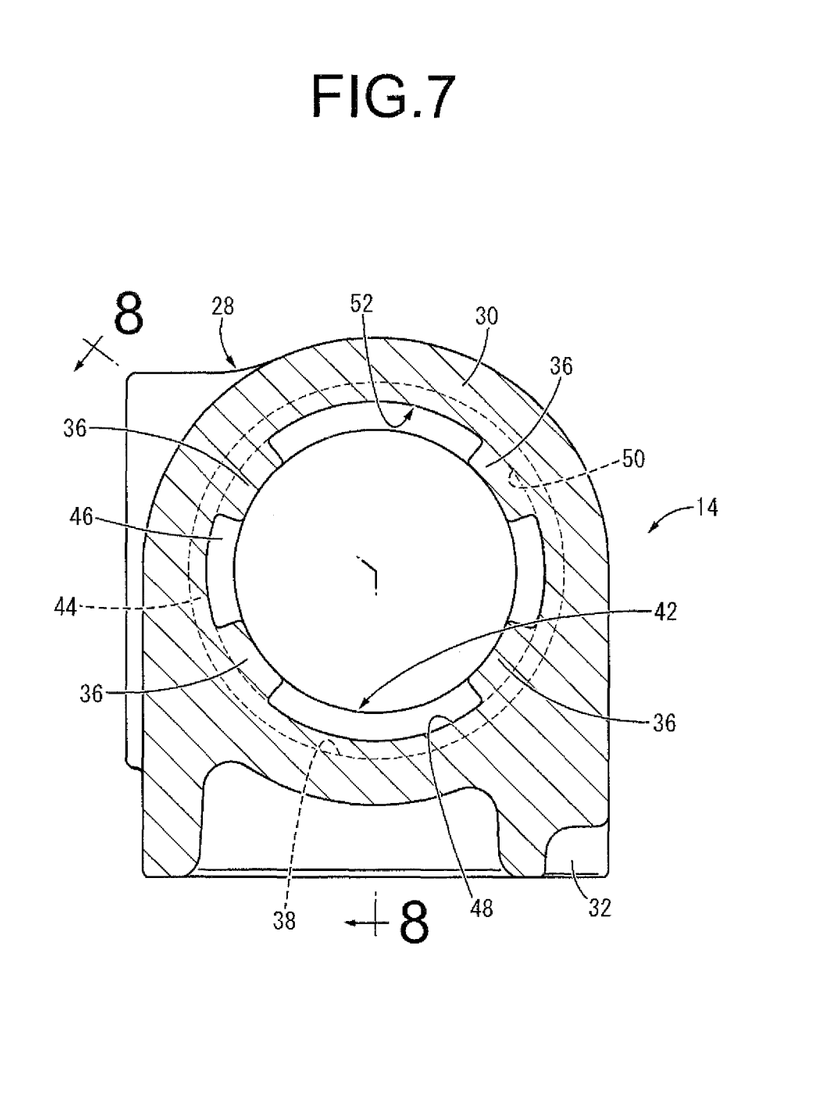
FIG. 7 is a cross sectional view taken along line 7-7 of FIG. 6.
Figure 8:
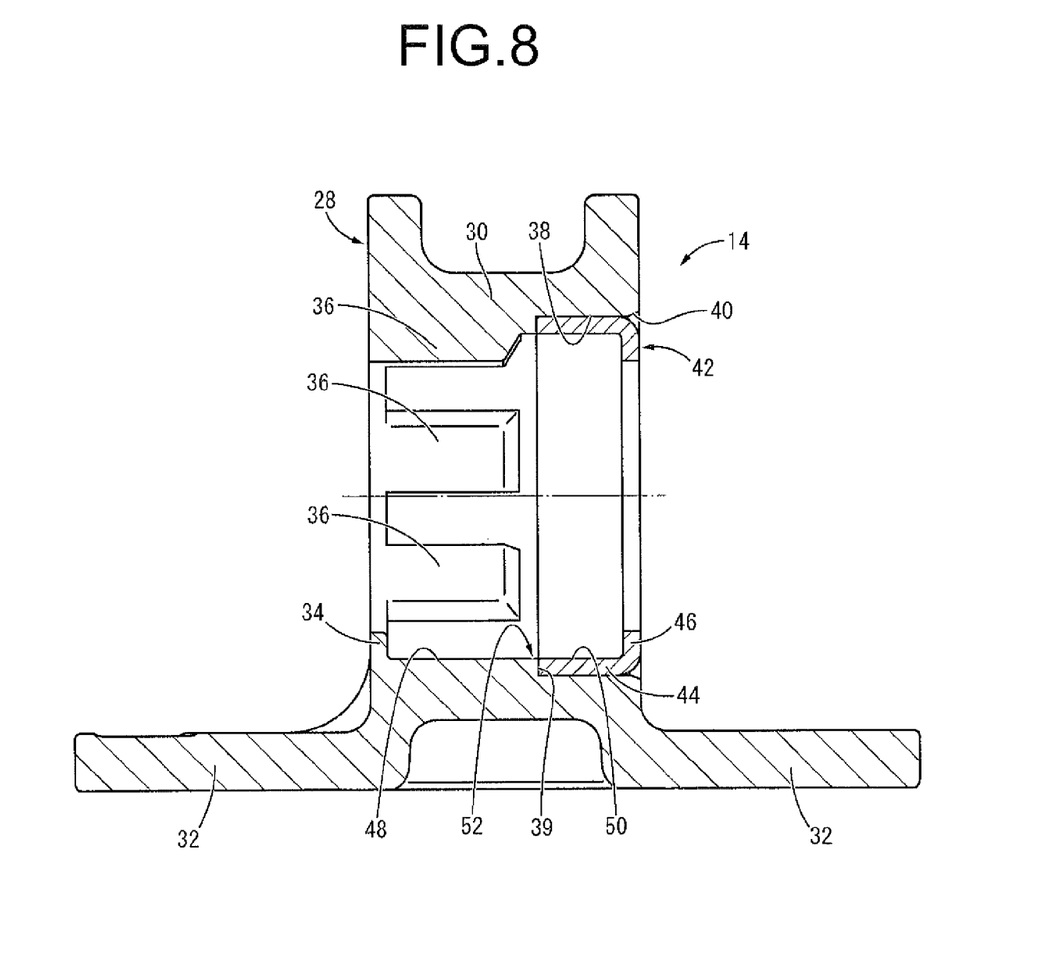
FIG. 8 is a cross sectional view taken along line 8-8 of FIG. 7.

Meanwhile, as shown in FIG. 6 through FIG. 8, the outer bracket 14 is equipped with a bracket main unit 28. The bracket main unit 28 is formed by die molding such as die cast molding or the like, and is formed using a metal material such as iron, an aluminum alloy or the like. Also, the bracket main unit 28 is equipped with a tube part 30 exhibiting a roughly cylindrical shape that is thick and large in diameter, and integrally has a pair of attachment pieces 32, 32 projecting to one side each in the axial direction at the bottom edge of the tube part 30. The bracket main unit 28 is made to be attached to the vehicle body (not illustrated) using a bolt (not illustrated) that is inserted in a bolt hole 33 formed by piercing on the attachment piece 32.

Furthermore, as shown in FIG. 8, an abutting protruding part 34 is formed at one axial end part of the tube part 30. The abutting protruding part 34 projects toward the inner circumference side of the tube part 30, and with this embodiment, is formed at a roughly fixed projection height along the entire circumference.

Furthermore, four locking projections 36, 36, 36, 36 are formed on the circumference of the tube part 30. As shown in FIG. 7 and FIG. 8, the locking projections 36 project toward the inner circumference side of the tube part 30, extend continuously in the axial direction, one axial end part is connected to the abutting protruding part 34, while the other end part extends up to a middle position which does not reach the opening of the tube part 30. Also, as shown in FIG. 7, the locking projection 36 has a gradually narrower width in the circumference direction facing the projecting tip, while as shown in FIG. 8, the other axial end surface is tilted to one axial side facing the projecting tip, and with this embodiment, the axial end surface, the both circumference end edges, and the projecting tip surface each have a curved shape at the boundary part and are formed to be smoothly continuous. Furthermore, the locking projections 36 are formed on the circumference of the tube part 30 at positions corresponding to the locking grooves 26 of the main rubber elastic body 18 in a state described later where the vibration damping device main unit 12 is attached to the outer bracket 14.

Furthermore, a large diameter part 38 is formed on the other axial end part of the tube part 30. This large diameter part 38 is positioned further to the axially outside than the other axial end part of the locking projection 36, and sandwiching a step 39, has the inner diameter larger than that of one axial side. Furthermore, the other axial opening end part of the tube part 30 has a tapered part 40 that gradually expands as it moves outward in the axial direction.

Figure 9:
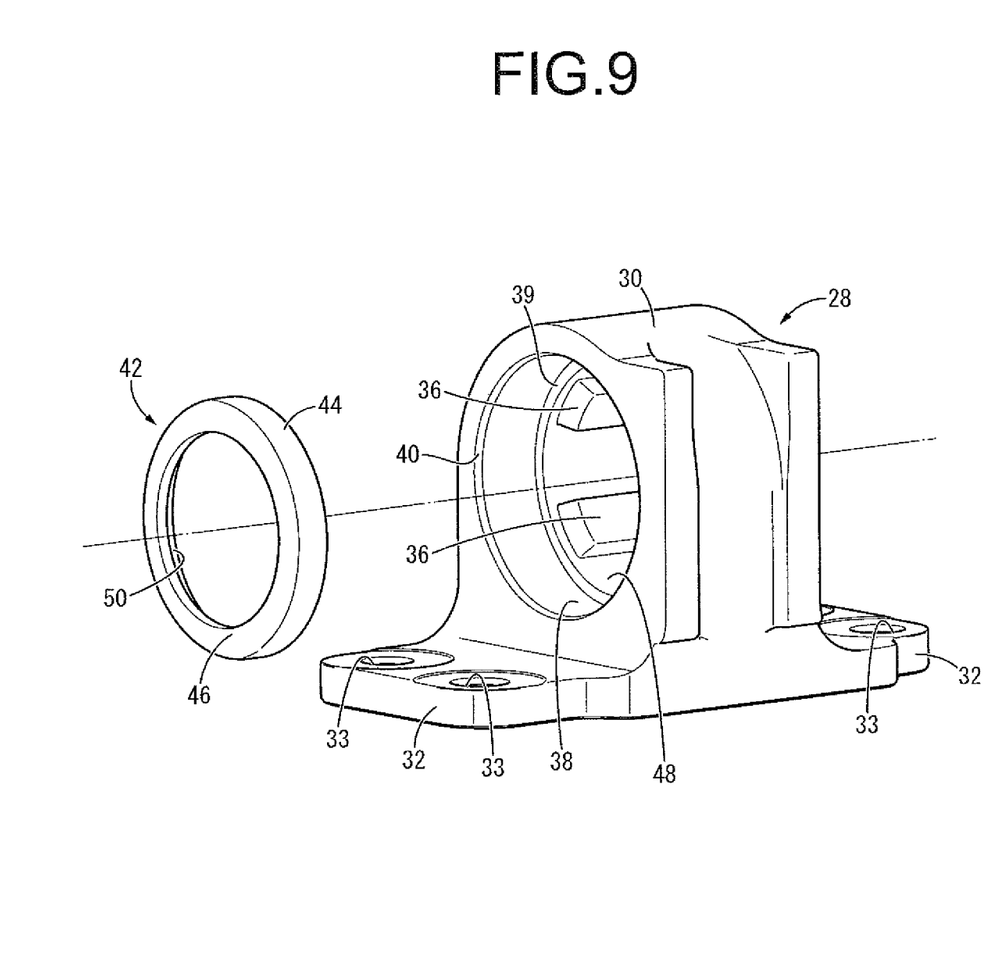
FIG. 9 is a perspective view suitable for explaining an exploded state of the outer bracket shown in FIG. 6.

Also, a press fit metal fitting 42 is attached to the bracket main unit 28. As shown in FIG. 7 and FIG. 8, the press fit metal fitting 42 is an annular member formed using metal, and has a roughly cylindrical shaped attachment tube 44, and also, at the other end part in the axial direction of the attachment tube 44, a roughly annular disk shaped retaining protruding part 46 is integrally formed continuously along the entire circumference in the circumference direction, projecting to the inner circumference side. As shown in FIG. 8 and FIG. 9, the attachment tube 44 is press fit from the other axial side to the large diameter part 38 of the tube part 30 of the bracket main unit 28, and by the press fit metal fitting 42 being attached to the other axial end part of the bracket main unit 28, the outer bracket 14 is constituted. With this embodiment, the tapered part 40 is formed at the other end side opening part in the axial direction of the large diameter part 38, and by the press fit metal fitting 42 being guided along the inclined surface of the tapered part 40, it is easier to press fit the attachment tube 44 of the press fit metal fitting 42 to the large diameter part 38.

In the state with the press fit metal fitting 42 attached to the tube part 30 of the bracket main unit 28, an inner circumference surface 48 of the part separated from the large diameter part 38 of the tube part 30 and an inner circumference surface 50 of the attachment tube 44 of the press fit metal fitting 42 are positioned roughly on the same cylindrical surface. Then, the inner circumference surface 48 separated to one axial end side from the large diameter part 38 of the tube part 30 (hereafter called the inner circumference surface 48 of the tube part 30) and the inner circumference surface 50 of the attachment tube 44 cooperate and constitute an attachment surface 52 attached to the outer circumference surface of the main rubber elastic body 18.

For example, by implementing chamfering processing or the like after molding on the inner circumference corner of the axial end part with the attachment tube 44 to make rounded corners, when press fitting the press fit metal fitting 42 to the bracket main unit 28 as described later, it is possible to avoid damage to the main rubber elastic body 18 due to contact of the inner circumference corner of the attachment tube 44 with the outer circumference surface of the main rubber elastic body 18. Similarly, by rounding the inner circumference corner of the step 39 of the tube part 30, it is possible to avoid damage to the main rubber elastic body 18 due to contact between the tube part 30 and the main rubber elastic body 18 when fitting the main rubber elastic body 18 into the tube part 30 of the bracket main unit 28. In fact, if a curved surface is used for both the inner circumference corner of the step 39 of the tube part 30 and the inner circumference corner of the attachment tube 44, even if vibration load is input in a state with the engine mount 10 mounted on the vehicle, and the outer circumference surface of the main rubber elastic body 18 is strongly pressed against the attachment surface 52, damage to the main rubber elastic body 18 due to abutting on the inner circumference corner of the tube part 30 and the inner circumference corner of the attachment tube 44 is prevented.

The outer bracket 14 constituted in this way is attached to the vibration damping device main unit 12 as shown in FIG. 2 and FIG. 3. Specifically, the vibration damping device main unit 12 is inserted in the tube part 30 of the bracket main unit 28, and by the press fit metal fitting 42 being press fit and fixed to the bracket main unit 28, the attachment tube 44 of the press fit metal fitting 42 is inserted between the large diameter part 38 of the tube part 30 and the main rubber elastic body 18 in the radial direction. By doing this, the attachment surface 52 constituted by the inner circumference surface 48 of the tube part 30 and the inner circumference surface 50 of the press fit metal fitting 42 is attached to each outer circumference surface of the first rubber arms 20, 20 and the second rubber arms 22, 22 of the main rubber elastic body 18, and the outer bracket 14 is attached non-adhesively to the outer circumference surface of the main rubber elastic body 18. It is possible that, after the main rubber elastic body 18 is inserted in the bracket main unit 28, the press fit metal fitting 42 is press fit and fixed to the bracket main unit 28, but in a state with the attachment tube 44 of the press fit metal fitting 42 fitted externally onto the main rubber elastic body 18, it is also possible to simultaneously perform insertion of the main rubber elastic body 18 to the bracket main unit 28 and press fitting of the press fit metal fitting 42 to the bracket main unit 28.

In this way, by the bracket main unit 28 and the press fit metal fitting 42 being separate members, it is possible to suitably set the shape and material properties and the like for each of the bracket main unit 28 and the press fit metal fitting 42 according to the required strength, ease of processing and the like. Therefore, by using a member that is sufficiently thick for the die molded bracket main unit 28, it is possible to obtain excellent load bearing properties, while by forming the press fit metal fitting 42 as a member equipped in advance with a retaining protruding part 46, it is possible to use a press fit metal fitting 42 equipped with a retaining protruding part 46 having sufficient deformation rigidity. In fact, by being press fit and fixed to the tube part 30 of the bracket main unit 28, the attachment tube 44 of the press fit metal fitting 42 is reinforced by the high rigidity tube part 30. Thus, it is possible to prevent the attachment tube 44 from deformation even if a large vibration is input in the axis-perpendicular direction.

Additionally, the attachment surface 52 attached to the outer circumference surface of the main rubber elastic body 18 is formed not only with the inner circumference surface 48 of the tube part 30 of the bracket main unit 28, but also in cooperation with the inner circumference surface 50 of the attachment tube 44 of the press fit metal fitting 42. Therefore, sufficient press fitting margin (axial length of the press fitting part) is ensured for the attachment tube 44 to the tube part 30, and it is possible to ensure a large attachment surface area of the outer bracket 14 to the main rubber elastic body 18 while realizing strong fixing of the press fit metal fitting 42 on the bracket main unit 28.

Also, with the outer circumference end parts of the main rubber elastic body 18 (each outer circumference end part of the first rubber arms 20, 20 and the second rubber arms 22, 22), two axial end surfaces overlap in an abutting state respectively to the abutting protruding part 34 of the bracket main unit 28 and the retaining protruding part 46 of the press fit metal fitting 42, and are held between the abutting protruding part 34 and the retaining protruding part 46 in the axial direction. By doing this, falling out of the vibration damping device main unit 12 in the axial direction in relation to the bracket main unit 28 is prevented by locking of the main rubber elastic body 18 in the axial direction to the abutting protruding part 34 and the retaining protruding part 46 of the press fit metal fitting 42. In particular with this embodiment, the retaining protruding parts 46 are formed continuously along the entire circumference, and the abutting surface area of the retaining protruding parts 46 on the axial end surface of the main rubber elastic body 18 is ensured to be large. As a result, falling out of the main rubber elastic body 18 in the axial direction in relation to the outer bracket 14 is more effectively prevented, and by dispersing the stress when the main rubber elastic body 18 is pressed against the retaining protruding part 46, the durability of the main rubber elastic body 18 is increased.

Furthermore, the outer circumference end part of the main rubber elastic body 18, by being grasped between the axially opposed surfaces of the abutting protruding part 34 of the bracket main unit 28 and the retaining protruding part 46 of the press fit metal fitting 42, is pre-compressed in the axial direction. Therefore, the spring constant of the main rubber elastic body 18 is easily adjusted by the main rubber elastic body 18 being mounted in the outer bracket 14.

Also, locking projections 36 of the bracket main unit 28 are respectively inserted in the four locking grooves 26, 26, 26, 26 of the main rubber elastic body 18, and locked in the circumference direction. Specifically, when the main rubber elastic body 18 is inserted in the axial direction in the tube part 30 of the bracket main unit 28, the locking projections 36 are aligned in the circumference direction to the locking grooves 26, and the locking projections 36 are inserted in the axial direction in the locking grooves 26. By doing this, relative rotation of the main rubber elastic body 18 in relation to the bracket main unit 28 is restricted, and suitable spring is set separately for each axis-perpendicular direction, and it is possible to effectively obtain the target vibration damping effect.

Furthermore, with this embodiment, the circumference direction width dimension of the locking projections 36 is greater than the circumference direction width dimension of the opening part of the locking grooves 26, and the locking projections 36 are fit into the locking grooves 26. Then, by the locking projections 36 being pressed in the circumference direction against the locking grooves 26, the outer circumference end part of the main rubber elastic body 18 is pre-compressed in the circumference direction between the locking projections 36, 36 in the circumference direction. Therefore, the spring of the main rubber elastic body 18 is easily adjusted by the main rubber elastic body 18 being mounted in the outer bracket 14. With this embodiment, the outer circumference end part of the main rubber elastic body 18 is constituted by the first rubber arms 20 and the second rubber arms 22 of different circumference direction width dimensions from each other, and both the first rubber arms 20 and the second rubber arms 22 are pre-compressed in the circumference direction at the outer circumference end part.

Also, the outer circumference surface of the main rubber elastic body 18 is pressed in the radial direction against the attachment surface 52 of the outer bracket 14 at the part separated from the locking grooves 26. By the outer bracket 14 being attached to the outer circumference surface of the main rubber elastic body 18, the main rubber elastic body 18 is pre-compressed in the radial direction. As is clear from the above, the main rubber elastic body 18, by being fitted to the outer bracket 14, is pre-compressed separately in the axial direction, the axis-perpendicular direction, and the circumference direction, and it is easy to adjust the spring characteristics without requiring a special pre-compression process.

Furthermore, as shown in FIG. 2, the projecting tip surface of the locking projection 36 in relation to the bottom surface of the locking groove 26 is arranged facing opposite, separated outward in the radial direction, and a space 54 is formed between the opposed surfaces of the bottom surface of the locking groove 26 and the projecting tip surface of the locking projection 36. By doing this, the elastic deformation of the main rubber elastic body 18 by pre-compression, vibration input or the like during mounting in the outer bracket 14 is sufficiently allowed by swelling to the inside of the space 54, and markedly higher dynamic spring behavior is avoided.

An embodiment of the present invention has been described in detail above, but the present invention is not limited to those specific descriptions. For example, with the embodiment noted above, the press fit metal fitting was formed as a pressed article, but it is also possible to obtain superior strength with the press fit metal fitting as a die formed article. When using this kind of die formed press fit metal fitting, it is also possible to have a protruding part that axial projects to the inner circumference surface of the attachment tube be formed on the circumference at a position corresponding to the locking projection 36, and to have the protruding part be inserted in the locking groove 26 of the main rubber elastic body 18 and locked in the circumference direction.

Also, the main rubber elastic body is not limited to the constitution equipped with the pair of first rubber arms 20, 20 and the pair of second rubber arms 22, 22 as with the embodiment noted above, and along with that, the number of locking grooves 26 is also not restricted. Furthermore, the number of locking projections 36 formed on the tube part 30 of the bracket main unit 28 can be suitably changed to match the number of locking grooves 26.

When the locking grooves 26 of the main rubber elastic body 18 or the locking projections 36 of the bracket main unit 28 are formed in plurality, by having the size or shape of the locking grooves 26 and/or the locking projections 36 be different, it is possible to set the spring characteristics to be mutually different in the plurality of axis-perpendicular directions for the vibration damping device. When a plurality of the locking grooves 26 are formed, it is not necessary to insert and arrange the locking projections 36 in all of the locking grooves 26.

Furthermore, it is acceptable as long as the locking grooves 26 of the main rubber elastic body 18 are formed at a part corresponding to the locking projections 36 of the bracket main unit 28, and do not necessarily have to be extending along the entire length of the axial direction.

Also, when mounting the main rubber elastic body 18 in the outer bracket 14, it is not essential that pre-compression be implemented on the main rubber elastic body 18, and the pre-compression direction noted in the embodiment is not to be interpreted as being restricted.

In addition, the projecting tip surface of the locking projection 36 and the bottom surface of the locking groove 26 can abut each other, and the space 54 is not essential.

Besides, between the step 39 of the bracket main unit 28 and the axial end surface of the attachment tube 44 of the press fit metal fitting 42, it is also possible to set a gap to prevent jamming of the main rubber elastic body 18. Also, at the inner circumference surface 48 of the bracket main unit 28, by providing a tapered surface area in the axial direction that expands facing the step 39, it is possible to prevent problems such as catching on the step 39 when fitting the main rubber elastic body 18 into the bracket main unit 28. Moreover, at the outer circumference surface of the press fit metal fitting 42, by providing a tapered surface area in the axial direction for which the diameter is reduced facing the axial tip surface of the press fit side, it is possible to make the press fit work onto the bracket main unit 28 easy.

The scope of application of the present invention is not limited to engine mounts, and for example can also be used for suspension member mounts, body mounts, differential mounts and the like. Furthermore, the subject of the present invention is not limited to vibration damping devices used with automobiles, but the present invention can also be suitably used for vibration damping devices used with motorcycles, railway vehicles, industrial vehicles and the like.

What is claimed is:

1. A vibration damping device comprising:
an inner shaft member;
a main rubber elastic body fixed to an outer circumference surface of the inner shaft member;
an outer bracket attached to an outer circumference surface of the main rubber elastic body; and
at least one locking groove formed extending in an axial direction on the outer circumference surface of the main rubber elastic body,
wherein the outer bracket is equipped with a die formed tube shaped bracket main unit, and the bracket main unit has at least one locking projection formed extending in the axial direction projecting to an inner circumference surface on the bracket main unit,
the locking projection of the bracket main unit is inserted and locked in a circumference direction in the locking groove of the main rubber elastic body with the bracket main unit being fitted externally onto the outer circumference surface of the main rubber elastic body,
an abutting protruding part projecting to an inner circumference side is formed on one axial end of the bracket main unit, and the abutting protruding part overlaps in the axial direction on an outer circumference end part of the main rubber elastic body,
a ring shaped press fit metal fitting is press fit and fixed to another axial end of the bracket main unit, the inner circumference surface of the bracket main unit and an inner circumference surface of the press fit metal fitting cooperate and are attached to the outer circumference surface of the main rubber elastic body,
a retaining protruding part projecting to an inner circumference side of the press fit metal fitting overlaps in the axial direction on the outer circumference end part of the main rubber elastic body, and
the main rubber elastic body is held between axially opposed surfaces of the abutting protruding part and the retaining protruding part.

2. The vibration damping device according to claim 1, wherein with the locking projection of the bracket main unit being fit into the locking groove of the main rubber elastic body and being pushed against the locking groove in the circumference direction, the outer circumference end part of the main rubber elastic body is pre-compressed in the circumference direction.

3. The vibration damping device according to claim 1, wherein with the outer circumference surface of a part away from the locking groove of the main rubber elastic body being pressed against the inner circumference surfaces of the bracket main unit and the press fit metal fitting, the main rubber elastic body is pre-compressed in an radial direction.

4. The vibration damping device according to claim 1, wherein with the outer circumference end part of the main rubber elastic body being grasped between axially opposed surfaces of the abutting protruding part and the retaining protruding part, the outer circumference end part of the main rubber elastic body is pre-compressed in the axial direction.

5. The vibration damping device according to claim 1, wherein a projecting tip surface of the locking projection is arranged separated from and facing opposite a bottom surface of the locking groove.

6. The vibration damping device according to claim 1, wherein the at least one locking groove comprises a plurality of locking grooves which are formed on an circumference of the main rubber elastic body, while the at least one locking projection comprises a plurality of locking projections which are formed at positions corresponding to each locking groove on the bracket main unit, and the locking projections are respectively inserted in the plurality of locking grooves to be locked in the circumference direction.

7. The vibration damping device according to claim 6, wherein the main rubber elastic body is equipped with a pair of first rubber arms sandwiching the inner shaft member and projecting to both sides, while a pair of second rubber arms sandwiching the inner shaft member in a direction orthogonal to the pair of first rubber arms and projecting to both sides, and the locking grooves are respectively formed between the first rubber arms and the second rubber arms in the circumference direction.

8. The vibration damping device according to claim 1, wherein the retaining protruding part of the press fit metal fitting is continuously formed along an entire circumference.

* * * * *